(12) United States Patent
Higaki

(10) Patent No.: US 6,547,235 B2  
(45) Date of Patent: Apr. 15, 2003

(54) SHEET SORTING APPARATUS AND AUTOMATIC DOCUMENT FEEDER APPARATUS INCLUDING THE SAME

(75) Inventor: Akiharu Higaki, Yamanashi (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/015,943

(22) Filed: Dec. 17, 2001

(65) Prior Publication Data

US 2002/0074711 A1 Jun. 20, 2002

(30) Foreign Application Priority Data

Dec. 19, 2000 (JP) .................................. 2000-384684

(51) Int. Cl.[7] ................................................ B65H 5/00
(52) U.S. Cl. ...................... 271/10.01; 271/118; 271/121
(58) Field of Search .............................. 271/10.01, 118, 271/117, 121

(56) References Cited

U.S. PATENT DOCUMENTS 4,556,209 A * 12/1985 Tsubo ..................... 271/118 X
5,582,399 A * 12/1996 Sugiura .................. 271/121 X
6,390,463 B1 * 5/2002 Iwago ....................... 271/118
6,431,541 B2 * 8/2002 Kuo et al. .................. 271/118

* cited by examiner

*Primary Examiner*—David H. Bollinger
(74) *Attorney, Agent, or Firm*—Kanesaka & Takeuchi

(57) ABSTRACT

A stopper member regulates the leading edges of sheets stacked on a sheet supply tray. In a first position of the stopper member, the sheets on a sheet supply tray are prevented from advancing into a paper feed path, and in a second position, the sheets drawn out by a draw-out device pass. The stopper member can be moved to a third position between the first and second positions. The displacement to the third position from the first position is associated with the lowering of the draw-out device for drawing out the sheets from the sheet supply tray, and the displacement from the third position to the second position is accomplished by the leading edge of a sheet drawn out by the draw-out device. This structure prevents damage to the original stacked on the sheet supply tray, and attains a simple structure and a low cost apparatus.

10 Claims, 7 Drawing Sheets

US 6,547,235 B2

SHEET SORTING APPARATUS AND AUTOMATIC DOCUMENT FEEDER APPARATUS INCLUDING THE SAME

BACKGROUND OF THE INVENTION AND RELATED ART STATEMENT

The present invention relates to a sheet feeding apparatus equipped with a sheet transport device for feeding sheets stacked on a supply tray. More specifically, it relates to a stopper mechanism to restrict the leading edges of sheets stacked on a supply tray.

Conventionally, in the sheet feeding apparatuses mounted on the sheet transport apparatuses, such as automatic document feeders, copy machines or printers for feeding sheets, such as originals or copy sheets stacked on a supply tray, sheets are placed in a condition that the stopper member protrudes in the supply tray, and a rising and lowering draw-out roller is lowered to touche the sheets, while at the same time, the stopper is retracted from the sheet supply entrance. The sheets are drawn by the rotation of the draw-out roller and are separated into a single sheet by separating means comprised of a supply roller and a separating member.

It is commonly known for the stopper member in a sheet feeding apparatus to have a structure in which the stopper member is related with the rising and lowering of the draw-out roller to be moved into and out of the sheet supply entrance. When the draw-out roller is at a raised position and the sheets are placed on the sheet supply tray, the stopper member protrudes into the sheet supply entrance or path to restrict the leading edges of the sheets thereby preventing the sheets from entering inside the machine. When the draw-out roller is at a lowered position and the sheets are being drawn into the machine, the stopper member retracts from the sheet supply entrance to allow the sheets to advance into the machine.

However, when a sheet is jammed inside the machine in the sheet supply apparatus, such as the one just described, the draw-out roller is controlled to rise to the sheet setting position to enable the resetting of the sheet after the jammed sheet has been cleared from the inside of the machine. The control to raise to the sheet setting position when removing the jammed sheet is necessary not only to enable a resetting of the sheet, but also to touch the draw-out roller against the sheet surface with the prescribed pressure.

When the draw-out roller is controlled to raise to the sheet setting position, the stopper member, associated with the raising of the draw-out roller, is forcibly protruded into the sheet supply entrance. At this time, if the sheets at the sheet supply entrance that are not jammed are not removed and placed on the sheet supply tray, the leading edge of the stopper member forcibly protruded will push the sheet causing the problem of damaging the sheet. Particularly, if thin sheets are being used, they can be torn.

Also, because the stopper member described above is structured to appear and disappear into and out of the sheet supply entrance by the drive actuated by a drive motor or a solenoid, such mechanism is complex and expensive.

An object of the present invention is to provide a sheet feeding apparatus that has a simple mechanism and is low cost and which does not damage sheets when the stopper member enters the sheet supply entrance while the sheets are on the sheet supply tray.

SUMMARY OF THE INVENTION

To attain the objectives of the present invention, the sheet feeding apparatus separates the sheets stacked on a sheet stacking tray into a single sheet for feeding the sheets to a predetermined sheet processing position, and includes draw-out means that touches the uppermost sheet on the sheet supply tray for drawing out sheets, support means for support the draw-out means to rise and lower, sheet feeding means for separating the sheets drawn out by the draw-out means into a single sheet and feeding the same, stopper means that rotates to a first position to restrict the leading edges of the sheets stacked on a sheet supply tray and to a second position to allow the sheets drawn out by the draw-out means to pass through, and displacement means to displace the stopper means associated with the lowering action of the draw-out means to a third position between the first position and second position to displace the stopper member to the third position from the first position using the displacement means. The stopper means moves from the third position to the second position by the leading edge of the sheets drawn out by the draw-out means.

Also, the sheet transport apparatus separates originals or sheets stacked on a sheet supply tray into a single sheet, feeds it to the reading position wherein the desired images on the sheet are read, and discharges the sheet read at the reading position to a discharge tray. It is equipped with draw-out means that touches the upper surface of the sheets on the sheet supply tray to draw the originals, and supporting means that supports the draw-out means to rise or lower. Further provided are paper feed means for separating sheets drawn out by the draw-out means into a single sheet for feeding, and a paper feed path formed to extend from the sheet supply tray for guiding the sheet fed by the paper feed means to the reading position. Stopper means is rotationally supported to have a first position disposed at the paper feed entrance of the paper feed path to regulate the leading edge of originals stacked on the sheet supply tray, a second position to allow the sheets drawn out by the draw-out means to pass therethrough, and a third position between the first and second positions.

Also disposed are regulating means to regulate the movement of the stopper means at the first position for regulating the leading edges of the sheets, displacement means to displace the stopper member in association with the dropping movement of the draw-out means from the first position to the second position, and release means to displace the stopper means from the first position to the third position by the displacement means. This also acts to release the regulation of the paper feed of the regulating means by displacing the stopper means from the third position to the second position by the leading edges of the sheets drawn by the draw-out means.

DETAILED DESCRIPTION OF PREFERRED EMBODIMENTS

Figure 1:
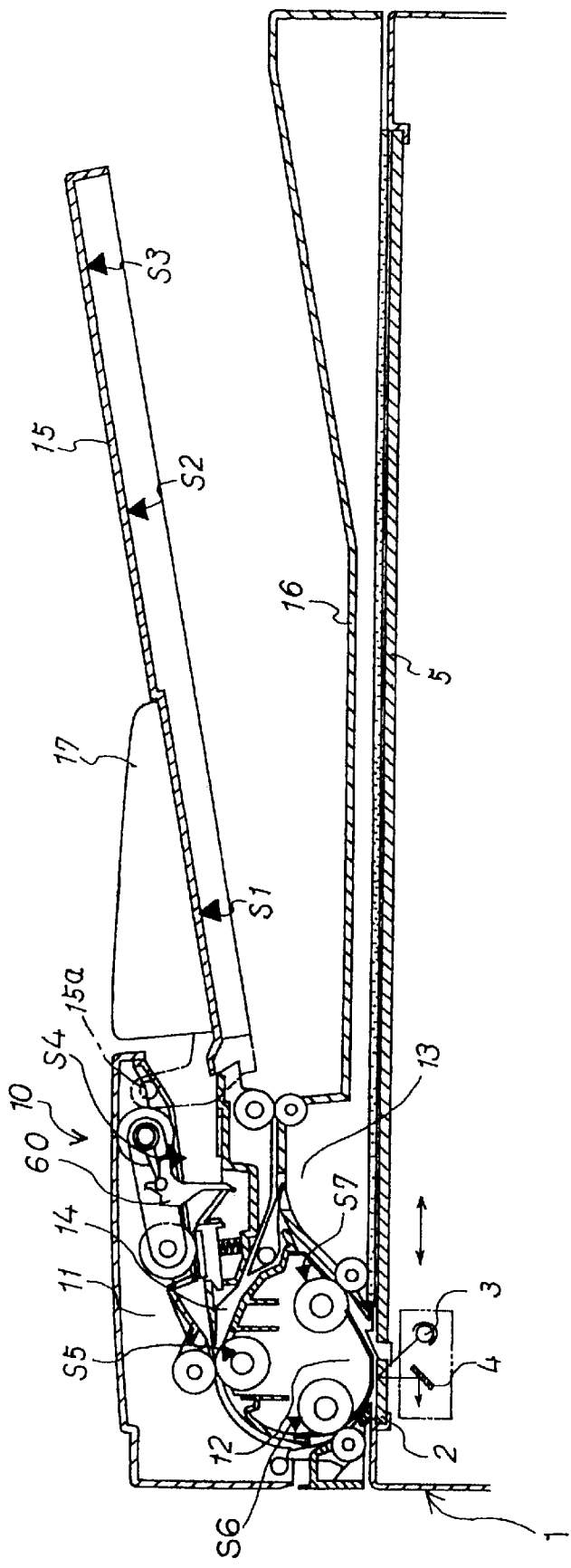
FIG. 1 is a sectional view of an automatic document feeder provided with an image reading apparatus according to the embodiment of the present invention.
Figure 2:
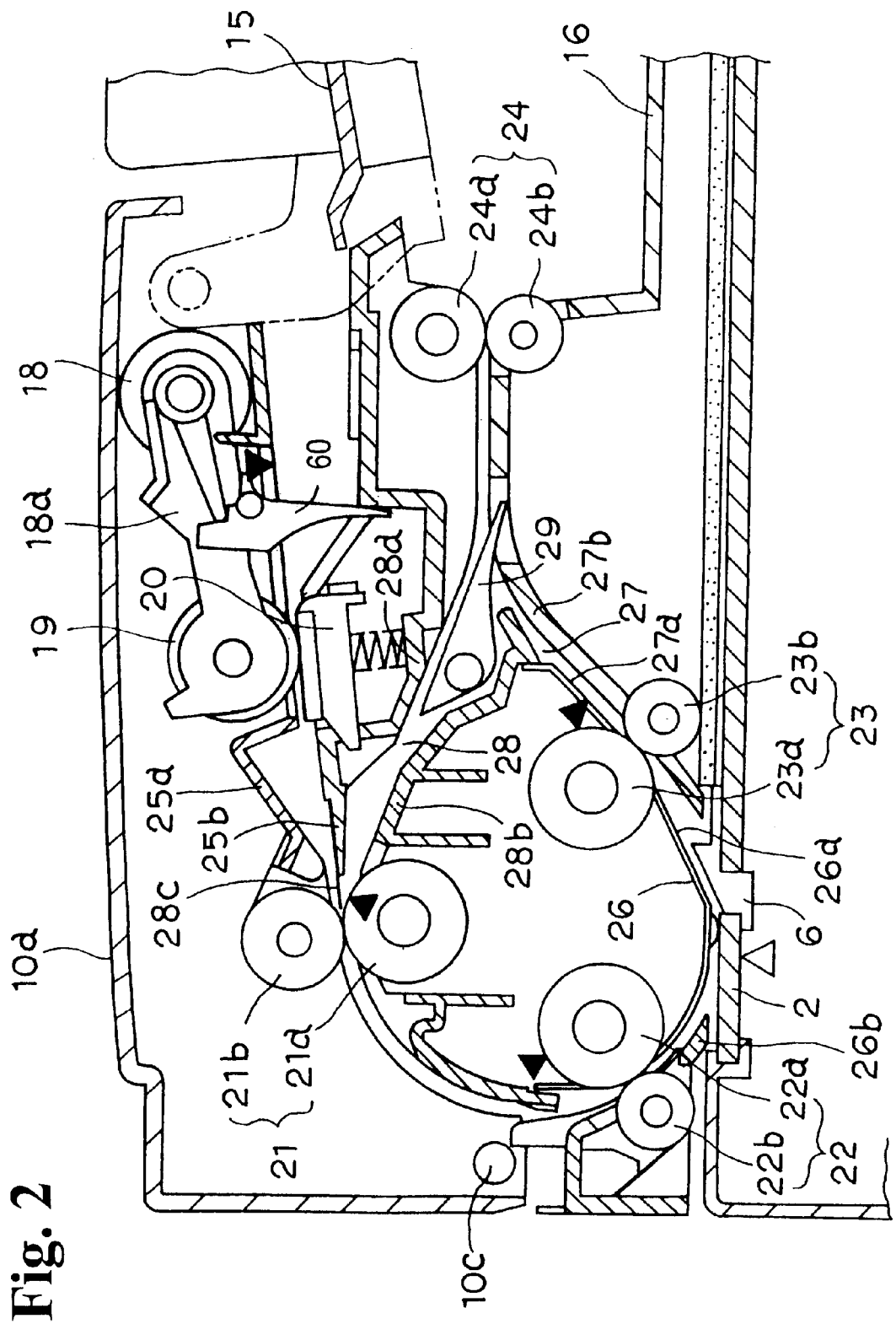
FIG. 2 is an enlarged sectional view of the apparatus shown in FIG. 1.

As an example of the preferred embodiment, FIG. 1 shows an automatic document feeder employing the invention, and FIG. 2 shows the essential parts of that automatic document feeder.

In FIG. 1, numeral 10 is the automatic document feeder equipped with an image reading device unit 1. The automatic document feeder 10 transfers originals or sheets above the upper surface of a contact glass 2 on the apparatus unit 1. The apparatus unit 1 irradiates light from a light source 3, such as a lamp, onto the transported original through the contact glass 2, and the reflected light is reflected by a mirror 4 to read the image on the original photo-electrically and convert by reading means, such as a CCD, etc. In other words, the upper surface of the contact glass 2 forms a reading position of the apparatus unit 1. Furthermore, the apparatus unit 1 is also provided with a contact glass 5 having a surface area capable of placing an original thereupon by opening and closing the automatic document feeder 10. By moving the optical unit comprising the light source 3 and mirror 4 in the sub-scanning direction, it is possible to read the image of the document through the contact glass 5.

The automatic document feeder 10 is provided with a sheet supply tray 15 which stacks a plurality of originals or sheets, a feeding unit (feeding means) 11 to separate originals on the sheet supply tray 15 into a single sheet and to feed each sheet toward the contact glass 2, a transport unit 12 for allowing the original to pass along the upper surface of the contact glass 2, a discharge unit 13 to receive the original passing through the upper surface of the contact glass 2 and to discharge the original, and a discharge tray 16 to store the original with the images having been read and discharged from the discharge unit 13. Furthermore, the automatic document feeder 10 includes a switch back unit for switching back the original from the contact glass 2 to the discharge unit 13 and re-sending the original to the feeding unit 11 to feed the original to the upper surface of the contact glass 2. The sheet supply tray 15 is slightly inclined obliquely and arranged to have a gap above the discharge tray 16.

The sides of originals stacked on the sheet supply tray 15 are regulated by a side-guide 17, and the leading edges of the originals are regulated by stopper members 60. Also, the sheet supply tray 15 is rotationally mounted at a pivot point 15a located at the leading edge side of the stacked originals.

The paper feed unit 11 comprises a rising and lowering draw-out roller 18 that is lowered to contact the uppermost sheet stacked on the sheet supply tray 15 to draw-out the sheets, a feed roller 19 to feed the sheets drawn out by the draw-out roller 18, separation means having a separation pad 20 that allows only the first or uppermost sheet to pass and to stop the second and subsequent sheets, and a register roller 21 to feed the sheet further downstream after abutting against the leading edge of the first sheet separated by the separation means to align the leading edge thereof and feed the sheet downstream along the paper feed path 25.

Figure 7:
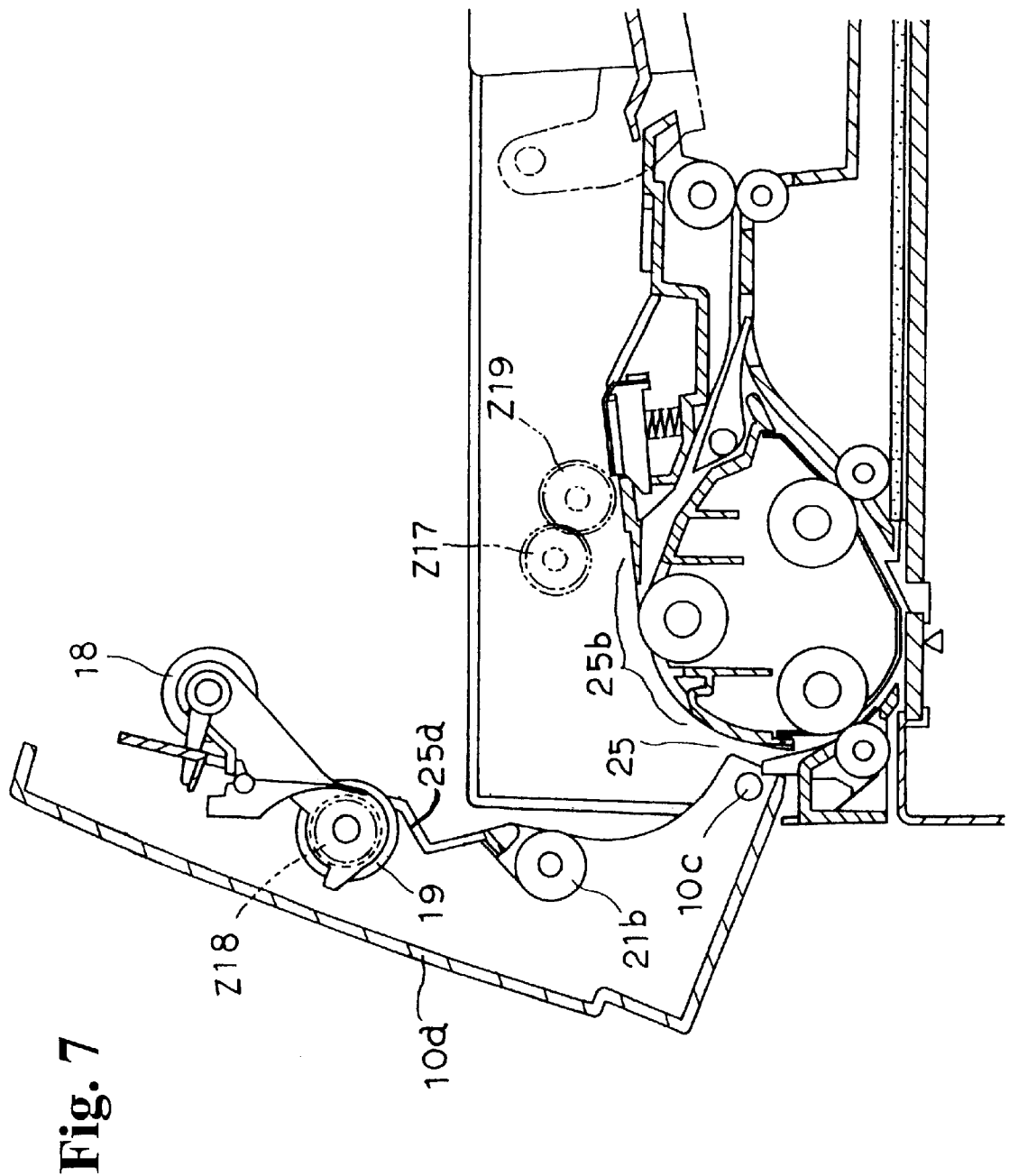
FIG. 7 is an explanatory sectional view showing the operation of the stopper member when rotating the outer cover.

The paper feed path 25 is formed by an opposing upper guide plate 25a and a lower guide plate 25b, as shown in FIG. 7. The upper guide plate 25a is fixedly disposed on an outer cover 10a which is rotationally supported on the rotating pivot point 10c thereby enabling the outer cover 10a as a single unit to open and close by rotating the same in the counterclockwise direction. Furthermore, on the outer cover 10a, there are disposed the draw-out roller 18, the feed roller 19, the roller 21b in the paired register rollers 21, and the stopper members 60 as a single unit. Through this structure, the entire paper feed path 25 from the sheet entrance on the original tray 15 to the front of the contact glass 2 is continuous and can be opened to expose the paper feed path 25 thereby enabling the easy removal of a jammed original.

Figure 3:
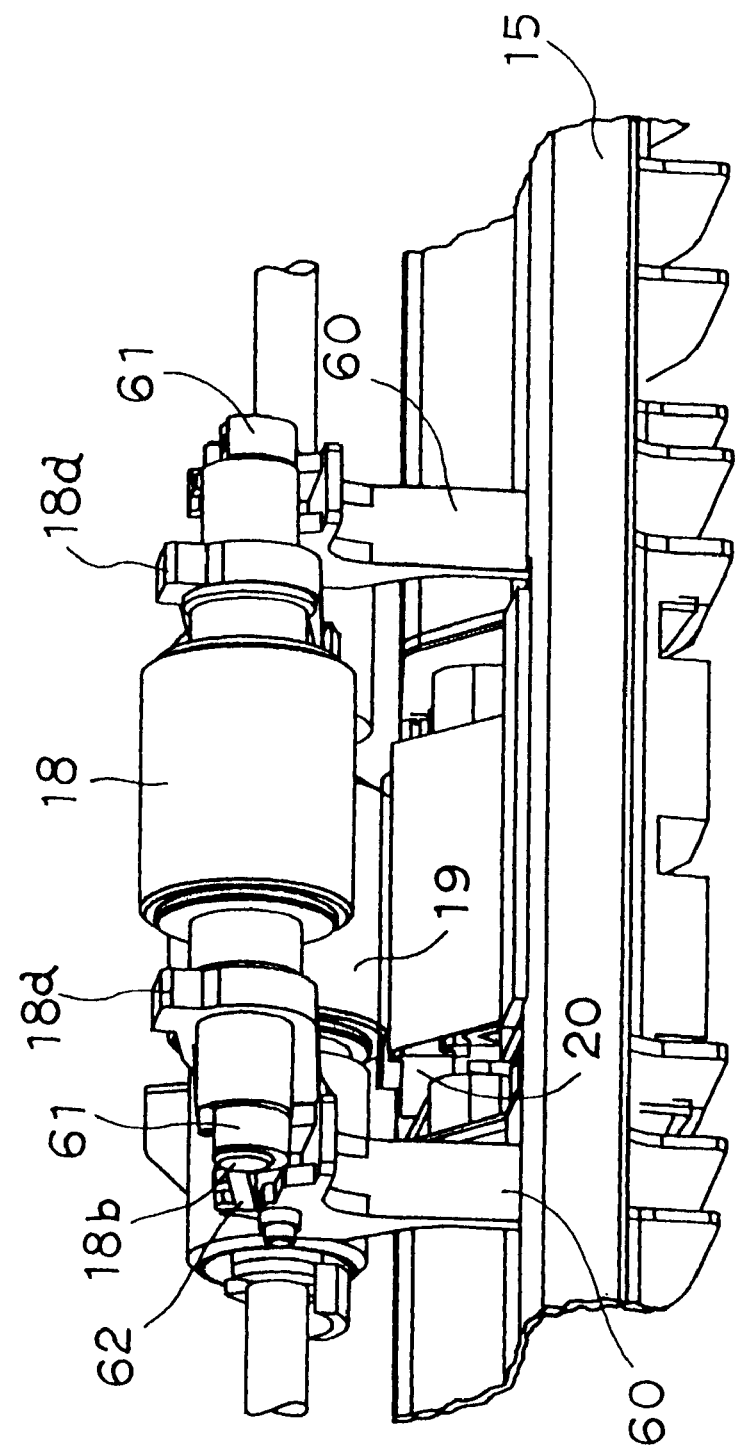
FIG. 3 is a perspective view showing a rising and lowering mechanism of a stopper member of the present invention.

The stopper members 60 are formed between the draw-out roller 18 and the feed roller 19, as shown in FIG. 2 and FIG. 3, and are disposed on both sides of the feed roller 19. These stopper members are rotationally mounted on the outer cover 10a and are structured to be interconnected to the rising and lowering of the draw-out roller 18 to move to a position to restrict the leading edges of originals stacked on the sheet supply tray 15 and to move to a position rotated for a predetermined amount upstream in the sheet feed direction. Furthermore, they are structured to rotate to a position retracted from the sheet supply entrance on the paper feed path 25 by being pushed up by the leading edges of the originals drawn-out by the draw-out roller 18 from the rotated position.

Figure 4A:
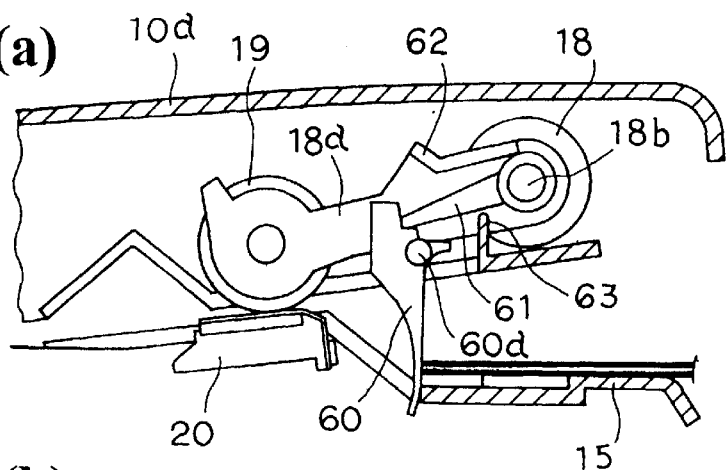
FIGS. 4(a)–4(d) are explanatory sectional views showing the rising and lowering mechanism of the stopper member.

To describe the rising and lowering movement of the stopper members 60 according to FIGS. 4(a)–4(d), first FIG. 4(a) shows the originals stacked on the sheet supply tray 15. At this point, the draw-out roller is at its raised position, and the stopper members 60 are at a position blocking the sheet supply entrance (the first position) and are restricted to rotate in the paper feed direction by a restricting member 61 which is free rotationally mounted on the draw-out roller axis. In this state, when the originals are advanced into the sheet supply entrance on the paper feed path 25, the leading edges of the originals abut against both sides of the stopper members 60, thereby being prevented from advancing further, and are stacked in the proper position on the sheet supply tray 15.

Figure 4B:
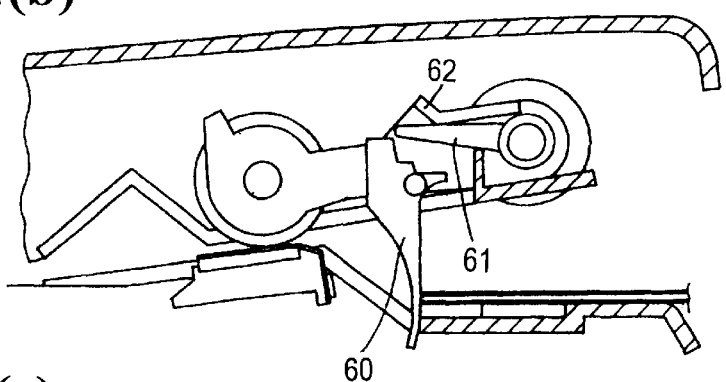

Then, when the draw-out roller 18 is lowered down with an original feeding instruction from the image reading apparatus 1, the restricting member 61 engaging the stopper members 60 for restriction touches the releasing member 63 disposed on the upper guide of the sheet supply entrance on the paper feed path 25 and rotates to thereby separate from the stopper members 60, as shown in FIG. 4(b). Then, the restriction on the stopper members 60 toward the paper feed direction is released by the separation of the restricting member 61 from the stopper members 60, and they are lowered vertically under their own weights.

Figure 4C:
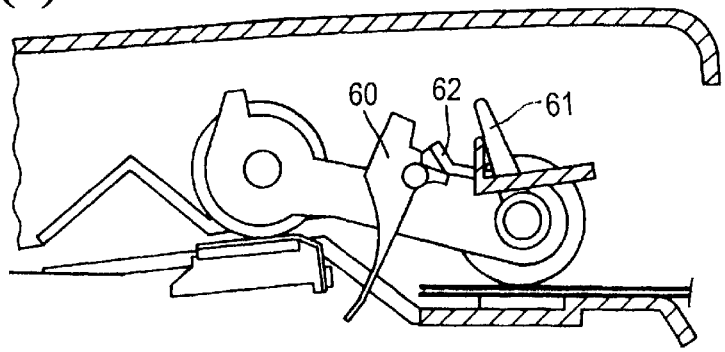

When the draw-out roller 18 is lowered for a predetermined amount, the other ends of the stopper members 60 touch the displacement member 62 which is provided on the rising and lowering arm 18a to rotate the stopper members 60 for a predetermined amount to incline to the paper feed direction, as shown in FIG. 4(c). At this point, the stopper members 60 drop under their own weights and at the position rotated for a predetermined amount (the third position) and inclined by the displacement member 62, rotation toward the upstream side in the paper feed direction is restricted to hold in an oblique position.

Figure 4D:
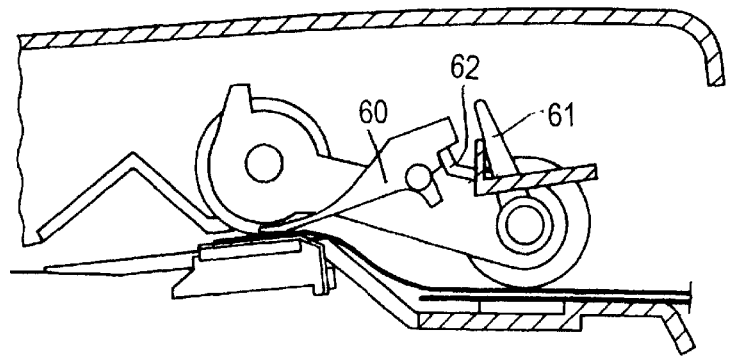

Then, when the draw-out roller 18 touches the uppermost original on the sheet supply tray 15, the rotation of the draw-out roller 18 draws the original toward the separation means. The leading edge of the original drawn out raises the stopper members 60 to a position where the original is able to pass through (the second position) and the original passes through the stopper members 60 to be fed to the separation means, as shown in FIG. 4(d). At this point, the lead edges of the stopper members 60 touch, under their own weights, the upper surface of the original being fed.

Later, when all of the originals on the sheet supply tray 15 have been fed, the stopper members 60 return to the positions touching the displacement member 62 under their own weights and are displaced under their own weights to the positions restricting the leading edges of originals stacked on the sheet supply tray 15 by the rising of the draw-out roller 18 to again be restricted by the restricting member 61.

At this time, even if the draw-out roller 18 is raised to remove a jammed original, etc. in the condition that the originals are disposed on the sheet supply tray 15, the stopper members 60 touch the upper surface of the original under their own weights, so that they will not be displaced. In other words, the stopper members do not move to the position to restrict the leading edges of the originals forcibly by being interconnected to the rising and lowering of the draw-out roller like conventional structure, but rather the stopper members 60 are displaced by their own weights regardless of the rising or lowering operation of the draw-out roller, so that the stopper members 60 do not damage the originals.

Depending on the rising and lowering structure of the aforementioned stopper members 60, the stopper members 60 are made to drop under their own weights which prevent the damage of the originals. Also, when drawing out the originals, the stopper members 60 rotate for a predetermined amount and are inclined, so it is possible to reduce the damage when the original sticks the stopper members 60, and even when drawing out the originals that are flimsy, such as thin sheets, the leading edges can easily rotate the stopper members 60.

Furthermore, if a small number of originals is stacked on the sheet supply tray 15, the lowering amount of the draw-out roller 18 becomes greater and the angle of the stopper members 60 (rotation amount) increases. Therefore, even with a small number of originals, the stopper members 60 can be easily pushed forward.

Also, when the originals are fed to the separation point of the feed roller 19 and separation pad 20, the stopper members push the original downward by their own weights at both ends of the feed roller 19, so that the leading edge of the original can be smoothly fed to the separation point to enable a good separation.

Next, the stopper rising and lowering operation will be explained when a jam occurs in the paper feed path 25 and the outer cover 10a is rotated to expose the paper feed path 25 according to FIG. 7. When the outer cover 10 is rotated, as described below, the drive transmission system gears for raising and lowering the draw-out roller 18 become un-meshed (separated), and because there is no holding force for the rising and lowering arm 18a, the draw-out roller 18 drops under its own weight. At this point, the stopper members 60 are held in positions rotated for an amount prescribed by the displacement member 62 because the draw-out roller is lowered.

This enables the stopper members 60 to smoothly move to the retracted positions touching the surface of the original without damaging the original because the stopper members 60 are in the positions inclined with regard to the surface of the original, even when the outer cover is closed in a condition that the original is on the sheet supply tray 15.

Furthermore, it is also acceptable to form the aforementioned releasing member 63 integrally with the upper guide to enable the releasing member to rotate, or to form the displacement member 62 integrally with the rising and lowering arm 18a.

The transport unit 12 is provided on the upstream side of the contact glass 2 with paired transport rollers 22 to supply the original to the contact glass 2 and paired transport rollers 23 to discharge the original from the contact glass 2 downwardly. The original is transported along the contact glass 2, a pick-up guide 6 and a transport path 26 formed by a back-up guide 26a on the automatic document feeder apparatus 1.

The discharge unit 13 and the switch back unit 14 share a part of the discharge tray 16 and are provided with the paired discharge rollers 24 to discharge the original to the discharge tray 16. In the duplex mode, which is described later, the paired discharge rollers 24 are controlled to nip the trailing edge of the original and rotate in reverse to switch back the original and feed it to the paper feed unit 11. Also, the paired discharge rollers 24 are structured so that the discharge coupled roller 24b is separated from the discharge drive roller 24a to transfer the original from the switch back unit 14 through the paper feed unit 11 and transport unit 12 without trouble when the leading and trailing edges of the original that is being circulated pass each other. Also, in the portion shared by the discharge unit 13 and switch back unit 14, there is disposed a flapper 29 to guide the original to the paper feed unit 11. The flapper 29 is always urged downward by an urging spring (not shown), and when the original is fed to the paired discharge rollers 24 along the discharge path 27, the leading edge of the original being discharged pushes it upward to allow the original to pass. The paired discharge rollers 24 are positioned downward when the original is switched back, and the discharge path 27 is blocked to guide the original into the switch back path 28.

The discharge path 27 is formed by a discharge upper guide 27a which extends from the back up guide 26a to be disposed opposite to the contact glass 2, and a discharge lower guide 27b made of resin to be integrally formed with the discharge tray 16. A switch back path 28 is formed by a switch back lower guide 28b disposed to continue to an original guide surface on the flapper 29, and a switch back upper guide 28a to guide the original to the nipping point of the paired register rollers 21. In other words, the switch back path 28 and paper feed path 25 are structured to join at the nipping point of the paired register rollers 21, at which a Mylar 28c extends to guide the original to the nipping point of the paired register rollers 21.

Figure 5:
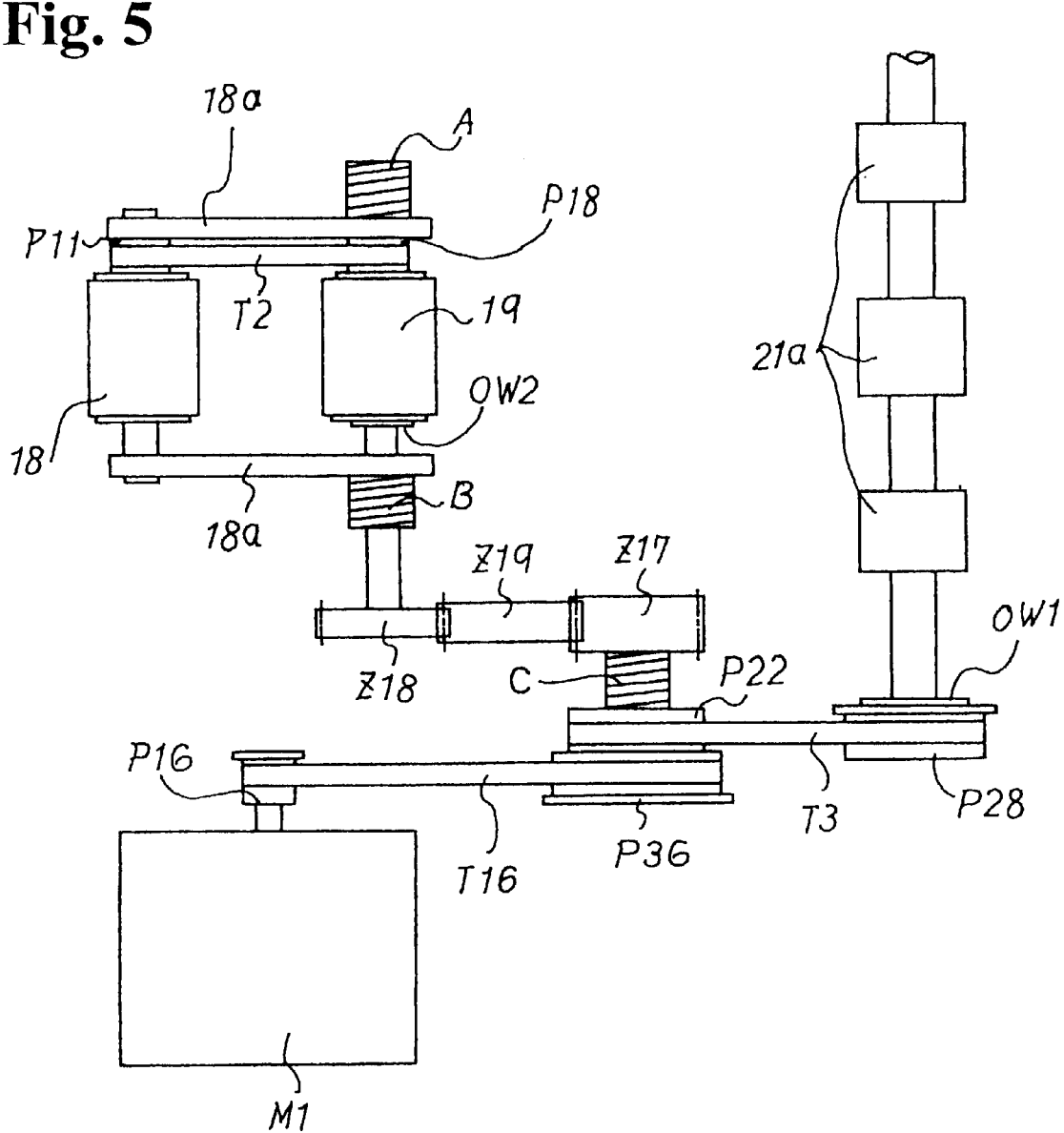
FIG. 5 is a plan view of the drive of the automatic document feeder shown in FIG. 1.
Figure 6:
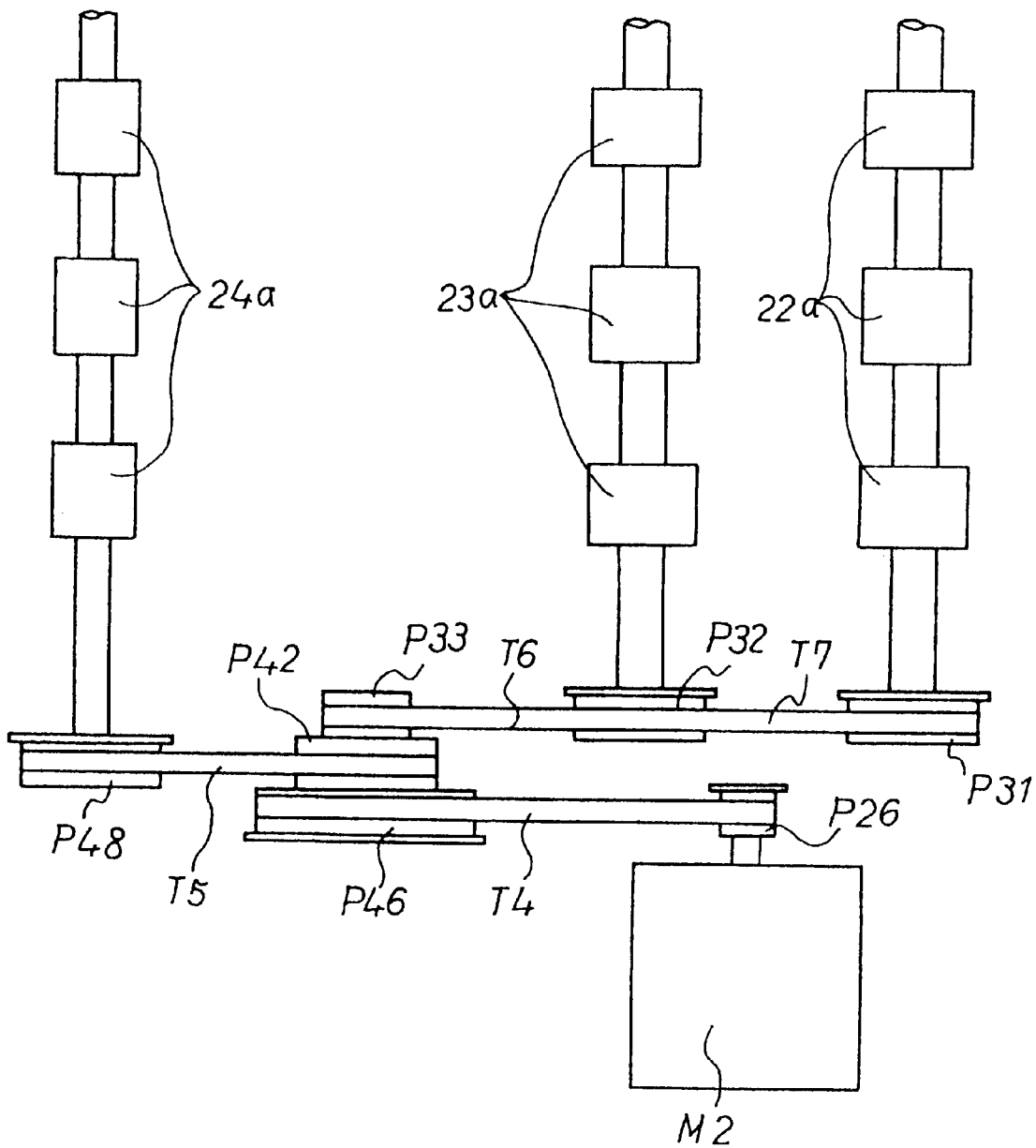
FIG. 6 is a plan view of the drive of the automatic document feeder shown in FIG. 1.

Next, a drive mechanism of each roller will be explained according to FIGS. 5 and 6. Incidentally, the automatic document feeder apparatus 10 comprises a forward and reverse operable paper feed motor M1, and a transport motor M2 to drive each roller. FIG. 5 shows a drive transmission system of the paper feed motor M1, and FIG. 6 shows a drive transmission system of the transport motor M2.

Firstly, with regard to the drive transmission system of the paper feed motor M1, a forward drive of the paper feed motor M1, as shown in FIG. 5, is transmitted from a pulley P16 to a pulley 36 via a timing belt T16. The drive of the pulley 36 is transmitted to drive axes of a gear Z17, a gear Z19, and a gear Z18 mounted to a feed roller 19, and the feed roller 19 rotates in the direction of feeding the original. To the drive axis of the feed roller 19, a pulley P18 is disposed. Drive force is transmitted to the draw-out roller 18 via a timing belt T2, which is trained between the pulley P18 and a pulley P11 disposed on the draw-out roller 18. Also, one end of the rising and lowering arm 18a that supports the draw-out roller 18 is mounted onto the drive axis of the feed roller 19. Rotation of the drive axis in the paper feed direction (forward drive of the paper feed motor M1) allows the rising and lowering arm 18a to rotate to thereby lower the draw-out roller 18. When the draw-out roller touches the original, a spring clutch A and a spring clutch B are activated to cause the drive axis of the feed roller 19 to idle with regard to the rising and lowering arm 18a. At this time, the register drive roller 21a is linked by a pulley P28 which is disposed on that drive axis and a timing belt T3 trained to the pulley P22 disposed on the same axis as the pulley P35, but the register roller does not rotate because of the action of a one-way clutch OW2 disposed on the pulley P28.

The reverse drive of the paper feed motor M1 is transmitted from the pulley P16 to the pulley P36 via the timing belt T1, and from the pulley 22 disposed on the same axis as the pulley P36 to the pulley P28 disposed on the axis of the register drive roller 21a via the timing belt T3, and rotates the register drive roller 21a in the paper feed direction. At this time, the reverse drive of the paper feed motor M1 is transmitted also to the drive axis of the feed roller 19 to rotate the rising and lowering arm 18a in the counter clockwise direction thereby raising the draw-out roller. However, due to the action of the one-way clutch disposed internally on the feed roller 19, it does not rotate. The raised rising and lowering arm touches the restricting member (not shown) and through the action of a spring clutch C, the drive axis of the feed roller 19 rotates idly with regard to the rising and lower arm 18a.

In such a structure, a gear Z18 mounted on the drive axis of the feed roller 19 is disposed in the outer cover 10a along the draw-out roller 18 and feed roller 19, and rotates integrally. As shown in FIG. 7, the outer cover 10a rotates to open the paper feed path 25 thereby separating from the gear Z19 and meshing with the gear Z19 by closing.

The drive transmission of the transport motor, as shown in FIG. 6, is transmitted from a pulley P26 disposed on a drive axis of the transport motor M2 to a pulley P46 via a timing belt T4, and from a pulley P33 disposed on the same axis as the pulley P46 to a pulley P32 mounted on the axis of the transmission drive roller 23a via a timing belt T6, and the transport discharge drive roller 23a rotates both forward and reverse. Also, the drive transmitted to the pulley P32 is transmitted to a pulley P31 mounted on an axis of the transport drive roller 22a via a timing belt T7, and the transport drive roller 22a is structured to rotate in both forward and reverse directions. In addition, the drive of the transmission motor M2 transmitted to the pulley P46 via the timing belt T4 is transmitted from a pulley P42 disposed on the same axis as the pulley P46 to a pulley P48 mounted on an axis of the discharge drive roller 24a via a timing belt T5, so that the discharge drive roller 24a rotates in both forward and reverse directions.

A plurality of sensors S1, S2 and S3 is disposed in the original feeding direction on the sheet supply tray 15 to detect the length of the original stacked on the sheet supply tray by the turning ON and OFF of these sensors. Also, the width direction of the original stacked on the sheet supply tray 15 is detected from the amount (not shown) of the side guide 17, the output of which changes according to the amount of movement of the side guide 17. Through the combination of the results of the detection of the width size and the original length detected by the plurality of the sensors S1, S2 and S3, the size of the original is determined.

Also, in the path for guiding the original, there are disposed an empty sensor S4 for detecting the original placed on the sheet supply tray 15, a register sensor S5 for detecting the edge of the original fed into the paper feed path 25, a read sensor S6 for detecting the edge of the original formed before the contact glass 2, and a discharge sensor S7 to detect the edge of the original discharged from the contact glass 2.

Each of the sensors S1 to S7 is connected to a CPU that controls the drive of the entire apparatus, and based on the detecting signals from the sensors, the motors M1 and M2 are driven.

The following describes in detail the operation of the original transport control on the automatic document feeder with the aforementioned structure.

Firstly, to explain the single-side mode for reading one side of the original, the empty sensor S4 is ON, in other words, when it is detected that original has been stacked on the sheet supply tray 15, the paper feed motor M1 is driven in the forward direction to feed the original. At this time, the draw-out roller 18 and feed roller 19 are rotated in the paper feed direction, but the paired register rollers 21 do not rotate due to the action of the one-way clutch OW2. Also, when the register sensor S5 detects the leading edge of the original being fed, the paper feed motor M1 stops once for a predetermined amount of time after that detection. When the paper feed motor M1 stops, the leading edge of the original touches the nip of the paired register rollers 21 to bend the original thereby aligning the leading edge of the original and eliminating skews. Then, after stopping once, the paper feed motor M1 is driven in reverse rotation while the transport motor M2 is driven. At this time, the draw-out roller 18 rises to the position separated from the original, and the feed roller 19 drive is interrupted by the action of the one-way clutch OW1. The register drive roller 21a on the paired register rollers 21 rotates in the paper feed direction.

The rotations of the aforementioned motors M1 and M2 transfer the original from the paper feed path 25 to the transport path 26, and after the leading edge of the original D1 has been detected to have passed by the sensor S6, the paper feed motor M1 is stopped after a predetermined time has passed and the transport motor M2 is temporarily stopped. Then, when the read transport signal is received from the image reading apparatus unit 1, the transport motor M2 is driven again. The upper surface (a single side) of the original is scanned by the reading means and is read. At this time, the flapper 29 arranged to block the discharge path 27 is lifted by the leading edge of the original to transport it to the discharge tray 16.

The following describes the operations using the duplex mode to read both sides of the original.

When the empty sensor S4 detects that original has been placed on the sheet supply tray 15, the original is fed in the same way as in the single-side mode to the contact glass 2 by the draw-out roller 18, the feed roller 19 and the paired register rollers 21. The front side of the original is read and then the original is guided to the discharge path 27.

The leading edge of the original being fed into the discharge path 27 pushes up the leading edge of the flapper 29 disposed to block the discharge path 27 and the original is fed to the discharge tray 16. After the discharge sensor S7 detects the trailing edge of the original, when the amount of time required for the trailing edge to pass the flapper 29 has passed, the transport motor is stopped. The trailing edge of the original is nipped by the paired discharge rollers 24 and the original is stopped.

Then, the transport motor M2 is driven in reverse. Through this, the discharge drive roller 24a rotates in reverse to switch back the original D1, which is then guided to the switch back path 28 along the inner surface of the original guide on the flapper 29 that was moved to a position blocking the discharge path 27 after the original has passed. The transport motor M2 which is driven in reverse stops after the prescribed amount of time has passed since the register sensor S5 detects the leading edge of the original guided into the switch back path 28 where a bend is formed at the nip of the paired register rollers 21 to remove any skew in the original.

Then, the paper feed motor M1 is driven in reverse to re-feed the original. The reverse drive of the paper feed motor M1 rotates the register drive roller 21a in the paper feed direction, and after passing of time for allowing the leading edge of the original to be securely nipped by the paired register rollers 21, the transport motor M2 is driven in the forward direction.

The original is then inverted and fed along the paper feed path 25. When the leading edge of the original is detected by the read sensor S6, the transport motor M2 stops after a predetermined amount of time, and at the same time, the paper feed motor M1 also stops. After that, the transport motor M2 is redriven by a read transport signal from the image reading apparatus 1, and the back side of the original is scanned and read by the reading means.

When reading is completed and a determined amount of time has passed after the discharge sensor S7 has detected the trailing edge of the original, the transport motor M2 is stopped and the trailing edge of the original is nipped by the paired discharge rollers 24 to stop the original.

Then, in order to arrange the page order of the originals on the discharge tray 16, the transport motor M2 is driven in reverse to allow the leading edge of the original to abut against the paired register rollers 21 in the switch back path 28 to remove any skew in the document. The original is inverted by the reverse drive of the paper feed motor M1 along the paper feed path 25, and when the read sensor S6 has detected the leading edge of the original, the drive of the paper feed motor M1 is stopped.

The original is then transported to the top of the contact glass 2, but because it is not going to be scanned or read at this point, there is no need to stop in front of the contact glass 2, so that the original is transported to the discharge path 27 and discharged to the discharge tray 16.

While the invention has been explained with reference to the specific embodiment of the invention, the explanation is illustrative and the invention is limited only by the appended claims.

What is claimed is:

1. A sheet feeding apparatus for separating sheets stacked on a sheet supply tray into a single sheet and feeding the sheets to a predetermined sheet processing position, comprising:
    draw-out means for touching and drawing an uppermost sheet on the sheet supply tray;
    support means connected to the draw-out means for rising and lowering the draw-out means;
    sheet supply means for separating the sheets drawn out by the draw-out means into a single sheet and feeding the single sheet;
    stopper means situated between the draw-out means and the sheet supply means, said stopper means being moved to a first position to restrict leading edges of the sheets stacked on the sheet supply tray and to a second position for allowing the sheets drawn out by the draw-out means to pass; and
    displacement means situated to cooperate with the stopper means to displace the stopper means to a third position between the first position and the second position in association with a lowering movement of the draw-out means so that the stopper means is displaced from the first position to the third position by the displacement means, said stopper means being displaced from the third position to the second position by the leading edges of the sheets drawn out by said draw-out means.

2. A sheet feeding apparatus according to claim 1, further comprising regulating means situated adjacent to the stopper means for regulating a movement of the stopper means in a sheet feeding direction of the stopper at the first position.

3. A sheet feeding apparatus according to claim 2, further comprising release means situated adjacent to the regulating means for releasing regulation of the regulating means to allow the stopper means to drop under its own weight.

4. A sheet feeding apparatus according to claim 1, wherein said displacement means is arranged such that when the draw-out means is lowered, the displacement means touches a part of the stopper means to push and move the stopper means in a paper feed downstream direction to thereby rotate the stopper means for a determined amount to move to the third position and regulate a movement of the stopper means to a paper feed upstream direction at the third position.

5. A sheet feeding apparatus according to claim 4, wherein said displacement means displaces a rotation amount of the stopper means according to an amount of the sheets stacked on the sheet supply tray.

6. A sheet feeding apparatus according to claim 1, wherein said second position is a position where the stopper means touches the upper surface of the sheet near the upstream side of the sheet supply means.

7. A sheet feeding apparatus according to claim 1, wherein said stopper means includes a plurality of devices arranged in a sheet width direction traversing the sheet feed direction.

8. An automatic document feeder apparatus, comprising:
    a sheet supply tray for stacking original sheets;
    draw-out means for touching a top surface among the original sheets and drawing out the original sheet on the sheet supply tray;
    support means connected to the draw-out means for rising and lowering the draw-out means;
    sheet supply means for separating the original sheets drawn out by the draw-out means into a single sheet and for feeding the single sheet;
    a discharge tray for storing the original sheets read at a reading position;
    an original sheet transport path having a paper feed path for guiding the original sheet fed by the sheet supply means and a discharge path extending from the paper feed path for guiding the original sheet read at the reading position to the discharge tray;
    stopper means rotationally disposed between the draw-out means and the sheet supply means, said stopper means being moved to a first position to regulate leading edges of the original sheets stacked on the sheet supply tray disposed at a paper feed entrance of the paper feed path, a second position for allowing the original sheets drawn-out by the draw-out means to pass and a third position between the first position and the second position;
    regulating means associated with the stopper means to regulate a movement of the stopper means at the first position for regulating the leading edges of the original sheets;
    displacement means to displace the stopper means from the first position to the second position in association with a lowering movement of the draw-out means; and
    release means situated adjacent to the stopper means to release regulation of the regulating means to allow the stopper means to lower by its own weight in order for the stopper means to be displaced from the first position to the third position by the displacement means and to be displaced from the third position to the second position by the leading edges of the sheets drawn out by the draw-out means.

9. A sheet feeding apparatus according to claim 8, further comprising an outer cover rotationally disposed to have a position for opening the paper feed path and a position for forming the paper feed path, said sheet supply means having a paper feed roller and a separation member pressed against the paper feed roller, said draw-out roller and said paper feed roller being disposed on the outer cover.

10. A sheet feeding apparatus according to claim 9, further comprising drive means including drive transmission means having a first gear and a second gear engaging with each other when the outer cover forms the paper feed path and disengaging from each other when the outer cover is opened to expose the paper feed path, and said support means includes an arm member rotating around a shaft of the paper feed roller, said drive means rotating the arm member.

* * * * *